March 24, 1931. S. W. NICHOLSON 1,797,786
OPERATING DEVICE FOR WINDOWS AND THE LIKE
Filed Sept. 14, 1927 2 Sheets-Sheet 1
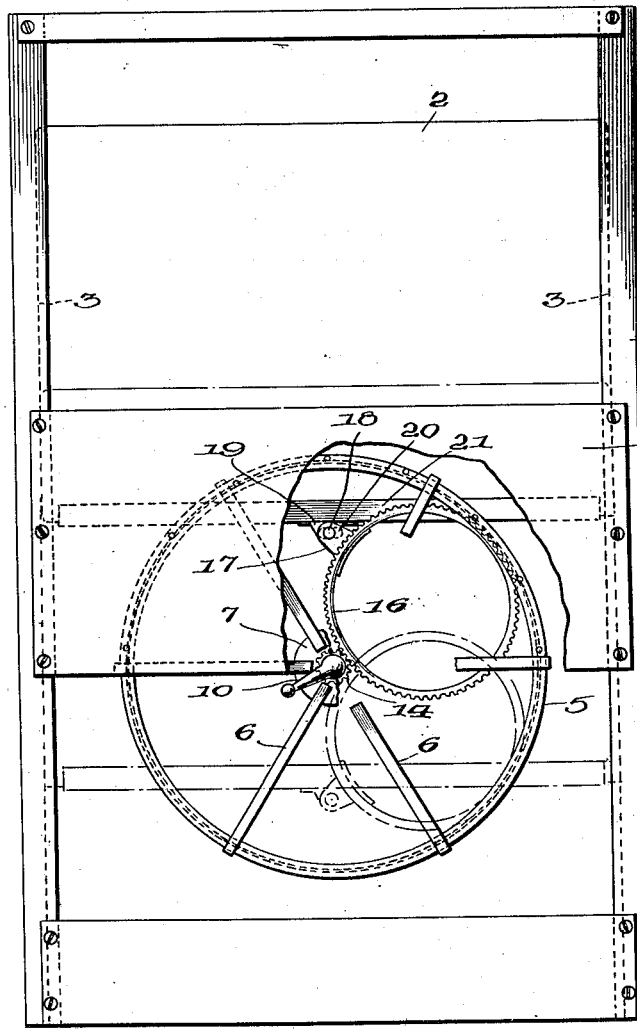
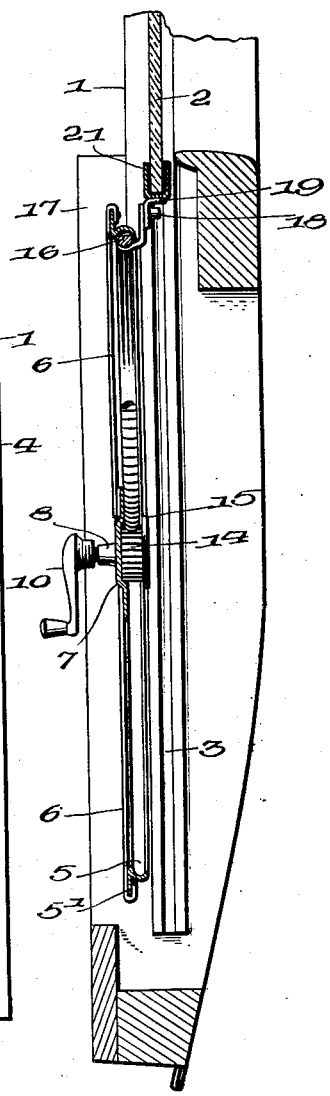
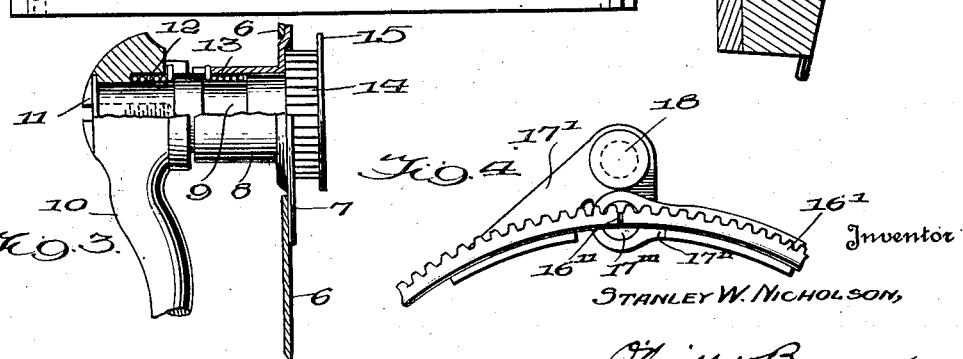
Inventor
STANLEY W. NICHOLSON,
By O'Neill & Bunn
Attorneys March 24, 1931. S. W. NICHOLSON 1,797,786
OPERATING DEVICE FOR WINDOWS AND THE LIKE
Filed Sept. 14, 1927 2 Sheets-Sheet 2
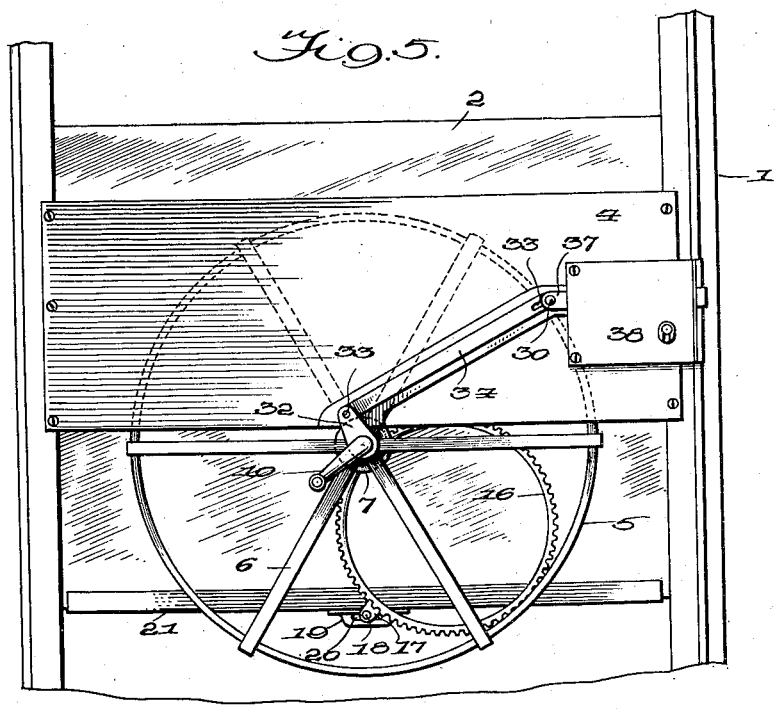
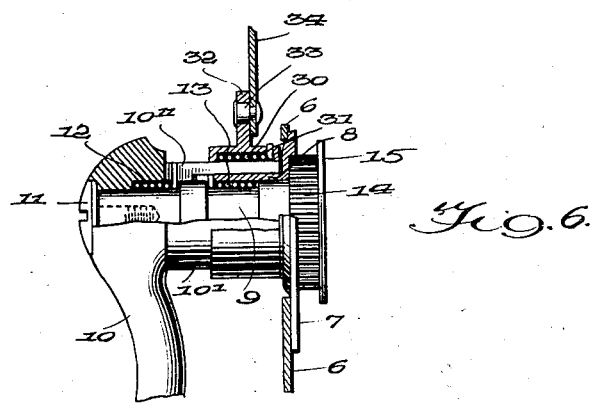
Inventor
STANLEY W. NICHOLSON,
By O'Neill & Bunn
Attorneys Patented Mar. 24, 1931

1,797,786

UNITED STATES PATENT OFFICE

STANLEY W. NICHOLSON OF TOLEDO, OHIO, ASSIGNOR TO THE LOCLIF COMPANY, OF TOLEDO, OHIO

OPERATING DEVICE FOR WINDOWS AND THE LIKE

Application filed September 14, 1927. Serial No. 219,463.

The invention relates to mechanism for operating automobile windows and similar devices, that may be associated with means operable by the handle of said mechanism for retracting the latch, when the window is mounted in a door; the window being alternately raised and lowered by the rotation of the handle in one direction and the latch being retracted by a partial rotation of the handle in the opposite direction without affecting the relative adjustment of the window.

The invention is illustrated in the accompanying drawings, in which:—

Fig. 1 is a front elevation of an automobile door frame with the glass operating mechanism applied thereto, certain of the parts being broken away.

Fig. 2 is a sectional elevation of the same.

Fig. 3 is an enlarged side elevation, partly in section, of the operating handle and appurtenant devices.

Fig. 4 is a fragmentary view showing a modified construction of the ring gear and means for connecting the same to the element to be lifted.

Fig. 5 is a view similar to Fig. 1, showing the application of the latch retracting means.

Fig. 6 is a view similar to Fig. 3, illustrating the details of the latch retracting means associated with the handle.

Referring to the drawings, 1 indicates the frame of an automobile door or similar structure, carrying the usual sliding glass 2, which is adapted to be guided, in its opening and closing movement, in slots 3 formed in the stiles of the door frame. Secured to the inside of the door stiles is a board or cross panel 4, which serves as a support for the operating device.

Fixed to the outer face of the support 4 is an annular trackway 5, which is preferably constructed as a sheet metal channeled annulus having an outwardly extending flange 5', which latter is provided with holes at intervals to receive the screws by means of which the track is secured to the support 4. Attached to the periphery of the track 5 and preferably to the flange 5' thereof, by spot welds or other appropriate fastening means, is a series of radial spokes 6, which are similarly attached at their inner ends to the flange 7 of a hub 8, which latter is concentric with the track 5.

Journaled in the hub 8 is a shaft or pintle 9, on the outer end of which is mounted a crank handle 10, which is secured in position by a set screw 11 in the outer end of shaft 9. Preferably the handle 10 is yieldingly attached to the shaft 9 by means of a coil spring 12 surrounding the shaft and enclosed in an enlargement of the opening in the hub of the handle, one end of the spring extending radially and engaging a slot in the hub of the handle, so that, when the handle is rotated in one direction, i. e. clockwise, the spring will be wound up and constitute a yielding clutch between the handle and the shaft, but will not prevent the free rotation of the handle in the opposite direction.

Fixed to or formed as an integral part of the end of the shaft 9, opposite that upon which the handle 10 is mounted, is a driving gear 14, preferably provided with an annular flange or shroud 15 on its outer face, as more particularly illustrated in Fig. 3.

A helical spring 13, similar in construction but opposite in action to spring 12, is interposed between the hub 8 and the shaft 9, one end of the spring engaging a slot in the outer end of the hub, said spring constituting a yielding brake between the hub and the shaft, to prevent any reverse rotation of the driving pinion by the dead weight of the glass 2, so that the latter will be held in any position of adjustment.

Meshing with the driving gear 14 is a ring gear 16, which is preferably made of a section of relatively heavy steel wire provided with gear teeth on its outer periphery, said ring gear having a diameter a little less than half that of the annular track 5, so that the outer periphery of the ring gear will engage the inner surface of the channel of the track and roll within said track with a rotatory motion about the axis of rotation of the driving gear 14, when the latter is operated by the handle 10.

Secured to the ring gear 16 is a bracket 17, which extends laterally and radially, so as to clear the outer face of the driving gear 14, when said bracket passes said driving gear. Projecting laterally from the radial arm of the bracket 17 is a pin 18, which engages a slot 20 formed in an angular bracket 19 which is secured by spot welding or otherwise to the mid section of a channel-like support 21, which embraces the bottom edge of the glass 2.

Because of the resiliency of the ring gear 16, the latter may be readily sprung into engagement with the channel of the track 5 and the teeth of the driving gear 14 and will be maintained in proper meshed relation with said gear by the flange or shrouding 15 on the driving gear 14 and this inherent resiliency will also insure the smooth operation of the ring gear, in that it will permit of the latter taking up any strains due to any obstruction to the free movement of the glass 2 in its guiding grooves 3.

As indicated in Fig. 1 of the drawings, the glass 2 is in partly lowered relation. When it is desired to move the glass to fully lowered position, the handle 10 is rotated in a clockwise direction, as shown in Fig. 1, which will cause the driving gear 14 to roll the ring gear 16 downwardly within the track 5 and, at the same time, impart a movement of revolution to the ring gear as a whole about the axis of the driving gear 14 as a center, thereby causing the pin 18 on the bracket 17 secured to the ring gear to move downwardly in a vertical line. When pin 18 reaches its lowest position, viz., when said pin, the center of ring gear 16 and the center of driving gear 14 lie in the same vertical plane, normal to the plane of the track 5, the glass will be completely lowered.

If the handle is further rotated in the same direction, the revolution of the ring gear is continued, said gear rolling up the left hand portion of the track 5 causing the pin 18 to rise vertically and lift the glass 2 in a closing movement, which will be completed when the pin 18 and the centers of the ring gear 16 and the driving gear 14 again lie in a vertical plane normal to the plane of the track 5 and, therefore, parallel with and including the axis of rotation of drive shaft 9. In other words, one complete revolution of the ring gear 16 about the axis of rotation of the driving gear 14 will cause the pin 18 to make one complete reciprocation parallel with the vertical diameter of the track 5, and, if the operation be initiated with the glass in closed position, a continuous rotation of handle 10 will effect a complete lowering of the glass followed by a complete lifting or closing of the same; the lowest position being reached when pin 18 lies opposite the lowest point on track 5 and, similarly, the highest or fully closed position of the glass being attained when pin 18 lies opposite the highest point on track 5, the handle 10 being continuously rotated in the same direction. Obviously, by arresting the rotation of the handle at the appropriate point, the movement of the glass will be stopped, and the glass will be retained in its adjusted position, either fully closed, fully opened, or partially opened, by the braking action of the spring 13, as described.

Under certain conditions, it may be found necessary or desirable to provide the ring gear with a somewhat greater degree of resiliency than would be inherent in the form illustrated in Fig. 1 and, to this end, the construction shown in Fig. 4 may be adopted, in which case the body of the ring gear 16', preferably formed of steel wire or the like, is broken at an interdental space, such as 16'', one end of the gear adjacent the break being connected to a bracket member 17', which carries the pivot pin 18 and the other end of the gear being connected to a link 17'' having an eye which is pivotally connected to a stud 17''' mounted in the bracket 17' below the pivot 18. The relative motion of the bracket 17' and the link 17'', on the stud 17''' admitting of the deformation of the ring gear at the break therein sufficient to permit the said ring gear to be sprung into position between the driving gear 14 and the guiding groove in the track 5.

As hereinbefore stated, the window operating mechanism is adapted to be associated with means for retracting the latch of the door, said means to be operated by the same handle that actuates the window operating mechanism, without, however, in any way affecting the operation of the window. Such a coordination is illustrated in Figs. 5 and 6, in which the window operating mechanism is identical in all respects with that heretofore described, except as to the specific form of the handle 10, which latter is provided with an extended hub 10' having a longitudinal slot 10'' therein, said hub adapted to fit over the hub 8 in which the shaft 9 is journaled. The handle 10 is fitted with the same type of helical spring clutch 12 as that illustrated in Fig. 3, so that, when the handle is rotated in one direction, the spring 12 serves as a clutch to couple the handle to the shaft 9, but rotation of the handle in the opposite direction is free and imparts no motion to the shaft 9. Likewise, this modification of the device involves the spring brake 13, similar in all respects to that shown in Fig. 3, which prevents the reverse rotation of the driving gear 14 by the weight of the window and serves to hold the latter in its adjusted positions.

Mounted on the extended hub 10' of the handle 10 is a collar 30 having an annular recess on its inner face, in which is mounted a helical spring 31 having one end thereof projecting radially and engaging an opening in the collar, said spring constituting a clutch between the handle 10 and the collar, when the handle is rotated in the direction opposite that required to operate the window, so that, if a clockwise rotation of the handle will effect raising and lowering of the window, a partial anti-clockwise rotation of the handle will cause the spring 31 to grip the hub 10' of the handle and impart a coextensive partial rotation of the collar 30. Extending radially from the collar 30 is a crank arm 32, which is connected by a pin 33 with a pull rod 34, the other end of which has a pin and slot connection with the latching bolt 37 of the lock 38 of the door, so that the partial rotation of the collar 30 by the reverse rotation of the handle 10 will cause the crank arm 10 to exert a pull on rod 34, thereby retracting the bolt 37 and unlatching the door, this operation being wholly independent of and not affecting the window in its position of adjustment, although the same handle 10 is employed to operate both the window and the door latch. It will be seen, therefore, that this relatively simple coordination of coacting parts provides a highly efficient window operating device associated with distant control mechanism for retracting the door latch, both mechanisms being operated by the same handle, thereby obviating the necessity of a separate handle or lever for the distant control of the door latch.

While the device has been illustrated and described as applied to and mounted upon a separate panel or support 4, it will be understood that the invention is not limited to such manner and form of application, as it is obvious that the track 5, if desired, might be formed upon or as an integral part of a door panel, or, in the alternative, said track may be attached to other parts of the door by suitable means.

What I claim is:

1. A window operating device comprising a driving gear, a ring gear meshing externally therewith, means adjacent the periphery of the ring gear for connecting the gear with the window element, and means for confining the movement of the ring gear to a circular path of revolution about the axis of the driving gear and the movement of the point of connection between the ring gear and the window element to substantially a right line.

2. A window operating device comprising a driving gear, a fixed annular track substantially concentric therewith, a ring gear meshing exteriorly with the driving gear and rolling in the track, and a lateral connection between the ring gear and the window element.

3. A window operating device comprising a cranked shaft, a driving gear fast thereon, a fixed annular track substantially concentric with said driving gear, a ring gear meshing exteriorly with the driving gear and rolling in the track, and a lateral connection between the ring gear and the window element.

4. A window operating device comprising a cranked shaft, a driving gear fast thereon, a fixed annular track substantially concentric with said driving gear, a ring gear meshing exteriorly with the driving gear and rolling in the track, and a laterally extending bracket fixed to the ring gear and adapted to engage the window element.

5. A window operating device comprising a hub, a drive shaft journaled therein, a driving gear fast on said shaft, a fixed annular track attached to and substantially concentric with said hub, a ring gear meshing exteriorly with the driving gear and rolling in the track, and a laterally extending bracket fixed to the ring gear and adapted to engage the window element.

6. A window operating device comprising an annular track fixed adjacent to and parallel with the window element to be moved, a hub fixed concentrically of said track, a shaft journaled in said hub, a driving gear fast on said shaft, a ring gear meshing exteriorly with the driving gear and rolling in said track, a laterally extending bracket fixed to the ring gear, a channeled support for the lower edge of the window element, and a pin and slot connection between the bracket and support.

7. A window operating mechanism comprising a shaft, a handle loose thereon, a one way clutch connection between the shaft and handle, a driving gear fast on said shaft, a fixed annular track attached to and concentric with said hub, a ring gear meshing exteriorly with the driving gear and rolling in the track, and a laterally extending bracket fixed to the ring gear and adapted to engage the window element; whereby continuous rotation of the handle in one direction will alternately raise and lower the window element.

8. A window operating device comprising a hub, a drive shaft journaled therein, a handle loose on said shaft, a one way clutch connection between the shaft and handle, a driving gear fast on said shaft, a ring gear meshing exteriorly with the driving gear and rolling in the track, a laterally extending bracket fixed to the ring gear adapted to engage the window element, and a brake interposed between the hub and shaft to prevent reversal of the shaft.

9. The combination with a window operating device including a driving shaft and gearing; and a latch retracting device including a collar concentric with said shaft and a link connection between the collar and latch; of a handle having an elongated hub interposed between said shaft and collar, and oppositely acting one way clutches connecting the handle and shaft and handle and collar respectively; whereby rotation of said handle in one direction will operate the window element and in the opposite direction will retract the latch.

10. The combination with a window operating device comprising a shaft, a driving gear fast thereon, a fixed annular track concentric therewith, a ring gear meshing with said driving gear and rolling in said track, and a lateral connection between the ring gear and window element; and a latch retracting device including a collar concentric with said shaft and a pull connection between the collar and latch: of a handle having an elongated hub interposed between said shaft and collar, and oppositely acting one way clutches connecting the handle and shaft and handle and collar respectively; whereby rotation of said handle in one direction will operate the window element and in the opposite direction will retract the latch.

11. The combination with a window operating device including a driving shaft and gearing adapted to raise and lower the window element by rotation of said shaft in one direction; and a latch retracting device including a collar rotatable about said shaft and a link connection between the collar and latch: of a rotary handle on said shaft, and oppositely acting one way clutches interposed between the handle and shaft and the handle and collar respectively.

12. A window operating device comprising a driving gear, a driven gear meshing therewith, means adjacent the periphery of the driven gear for connecting the latter with the window element, and means for confining the movement of the driven gear to a path of revolution about the axis of the driving gear and the point of connection between the driven gear and window element to substantially a right line.

13. A window operating device comprising a driving gear, a fixed annular track surrounding the same, a driven gear meshing with the driving gear and rolling on said track, and a lateral connection between the driving gear and the window element adjacent the periphery of the driven gear, whereby the movement of said connection is substantially in a right line.

14. The combination, with a window operating device and a latch retracting device, of a prime mover for operating said devices selectively, by varied actuations of said prime mover.

15. The combination with a window operating device and a latch retracting device, of a prime mover for automatically operating said devices selectively, by varied actuations of said prime mover.

16. The combination with a window lifter, and a door latch mechanism, of a prime mover adapted by normal operation to actuate said window lifter, and means, operable by an abnormal actuation of the prime mover, adapted to disconnect the window lifter from the prime mover and to operatively connect the door latch mechanism thereto.

17. The combination with a window lifter, and a door latch mechanism, of a prime mover adapted by normal operation to actuate said window lifter, and means, operable by an abnormal actuation of the prime mover, adapted to automatically disconnect the window lifter from the prime mover and to operatively connect the door latch mechanism thereto.

18. The combination, with a window lifting mechanism, a door-latch retracting mechanism, and a prime mover, of means for selectively interengaging either of said mechanisms with said prime mover.

19. Mechanism of the class described for installation in a chamber equipped with a window, and a door having a latch, including a prime mover for opening and closing said window and means connected to said prime mover adapted, under a certain movement of the latter, to retract the latch of said door.

20. The combination, with a window lifter and a door-latch operating mechanism, of a unitary mechanism forming a part of each operating mechanism, and means for selectively employing a part of said unitary mechanism in actuating either the window lifter or the latch.

21. The combination with window lifting and door-latch retracting mechanisms, of intervening, selectively-operable mechanism, forming a part of each said lifting and retracting mechanisms, and a handle for selectively operating either the window or latch mechanism.

22. Window lifter and door latch retracting mechanisms, including a selectively-operable element forming a part of each mechanism, in combination with a control device adapted for operation to cause said selective element to actuate the window lifting mechanism, or the door latch retracting mechanism.

23. The combination, with a window lifting mechanism, a door-latch retracting mechanism and a prime mover for actuating either mechanism, of means selectively engageable with the prime mover whereby to adapt the latter to actuate either of said mechanisms.

24. In combination with an automobile door latch and window regulator, a single operating handle therefor, and means for establishing an operative connection at will between said handle and the door latch or the window regulator.

25. In combination with an automobile door latch and window regulator each having an actuating element, a single operating handle therefor, and means for establishing an operative connection at will between said handle and the door latch or the window regulator, and including a part carried by said handle and having means for releasable connection with the respective actuating elements.

26. In combination with an automobile door latch and window regulator each having an actuating element, a single operating handle therefor, and spaced means carried by said handle releasably engageable with the respective actuating elements to establish an operative connection at will between the operating handle and the door latch or window regulator.

In testimony whereof I affix my signature.

STANLEY W. NICHOLSON.